United States Patent
Peng

(10) Patent No.: US 8,738,939 B2
(45) Date of Patent: May 27, 2014

(54) SYSTEM AND METHOD FOR TESTING WOL FUNCTION OF COMPUTERS

(75) Inventor: Zheng-Quan Peng, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 153 days.

(21) Appl. No.: 13/156,355

(22) Filed: Jun. 9, 2011

(65) Prior Publication Data

US 2012/0072742 A1  Mar. 22, 2012

(30) Foreign Application Priority Data

Sep. 17, 2010  (CN) .......................... 2010 1 0285088

(51) Int. Cl.
*G06F 1/00* (2006.01)
(52) U.S. Cl.
USPC ........... 713/300; 713/310; 713/320; 713/321; 713/322; 713/323; 713/324; 713/330; 713/340
(58) Field of Classification Search
USPC .................. 713/300, 310, 320–324, 330, 340
See application file for complete search history.

(56) References Cited

U.S. PATENT DOCUMENTS

| | | | |
|---|---|---|---|
| 2007/0094708 A1* | 4/2007 | Hess | 726/2 |
| 2008/0313689 A1* | 12/2008 | Suzuki et al. | 725/118 |
| 2009/0217063 A1* | 8/2009 | Tomita | 713/310 |
| 2011/0022812 A1* | 1/2011 | van der Linden et al. | 711/163 |
| 2012/0233611 A1* | 9/2012 | Voccio | 718/1 |

* cited by examiner

*Primary Examiner* — M Elamin
(74) *Attorney, Agent, or Firm* — Novak Druce Connolly Bove + Quigg LLP

(57) ABSTRACT

In a system and method for testing a wake-up on LAN (WOL) function of a computer, the computer connects to a server through a local area network (LAN). The system constructs a network connection between the server and the computer according to an Internet protocol (IP) address, a media access control (MAC) address and a name of the computer, and enables the computer in a wake-up mode when the server connects to the computer through the LAN. A wake-up command is generated for waking up a WOL function of the computer, the computer performs a WOL function test process according to the wake-up command. The sever detects a current status of the computer from a data packet when the data packet is received from the computer, and records the current status as a test result of the WOL function of the computer.

9 Claims, 3 Drawing Sheets

SYSTEM AND METHOD FOR TESTING WOL FUNCTION OF COMPUTERS

BACKGROUND

1. Technical Field

Embodiments of the present disclosure relate to function test systems and methods for computers, and particularly to a system and method for testing wake-up on LAN (WOL) function of a computer.

2. Description of Related Art

A server may turn on a plurality of terminal computers in a local area network (LAN) through a network interface card (NIC) installed in each of the terminal computers. Wake-up on LAN (WOL) function is a mechanism that can turn each of the terminal computers on by receiving a special data packet through the LAN. Through the WOL function, a wake up event occurring from the LAN can wake up the terminal computers. Accordingly, it is needed to test whether a WOL function of a computer operates normally before shipping the computer with the NIC.

DETAILED DESCRIPTION

The present disclosure, including the accompanying drawings, is illustrated by way of examples and not by way of limitation. It should be noted that references to "an" or "one" embodiment in this disclosure are not necessarily to the same embodiment, and such references mean at least one.

Figure 1:
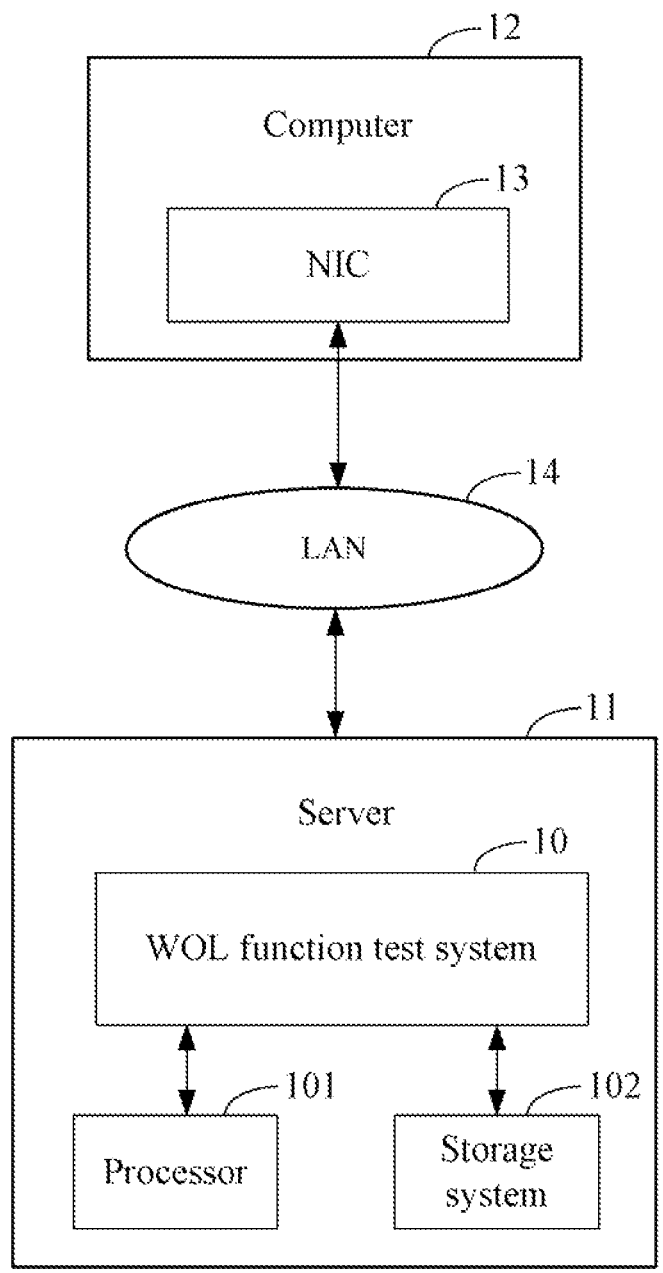
FIG. 1 is a block diagram of one embodiment of a system for testing a wake-up on LAN (WOL) function of a computer.

FIG. 1 is a block diagram of one embodiment of a system for testing a wake-up on LAN (WOL) function of a computer 12, hereinafter referred to as the "WOL function test system 10". In the embodiment, the system 10 is installed and implemented by a computing device (e.g., a server 11 as shown in FIG. 1) that is connected to the computer 12 through a local area network (LAN) 14. The system 10 comprises one or more modules (shown in FIG. 2) in the form computerized codes, and can test whether the computer 12 performs a WOL function through the LAN 14 normally.

The server 11 may further include at least one processor 101 and a storage system 102. The system 10 may comprise computerized code in the form of one or more programs that are stored in the storage system 102, and executed by the at least one processor 12 to provide functions for testing the WOL function of the computer 12. In one embodiment, the storage system 102 may be an internal storage system, such as a random access memory (RAM) for temporary storage of information, and/or a read only memory (ROM) for permanent storage of information. In some embodiments, the storage system 102 may also be an external storage system, such as an external hard disk, a storage card, or a data storage medium.

The computer 12 includes, but is not limited to, a network interface card (NIC) 13 that communicates with the server 11 through the LAN 14. The server 11 can test the WOL function of the computer 12 based on the NIC 13 when the system 10 is executed by the least one processor 101. In one embodiment, the computer 11 supports an advanced configuration and power interface (ACPI) specification that specifies different operation modes for the computer 11. The operation modes may include S0, S1, S2, S3, S4, and S5 modes, where the S0 mode is a working mode, and each of the S1-S5 modes is a wake-up mode. The working mode represents that the computer 11 works normally. Each of the wake-up modes represents that a specific hardware component of the computer 11 may be woke up, such as a central processing unit (CPU) needs to be woke up, or memory needs to be woke up, for example.

Figure 2:
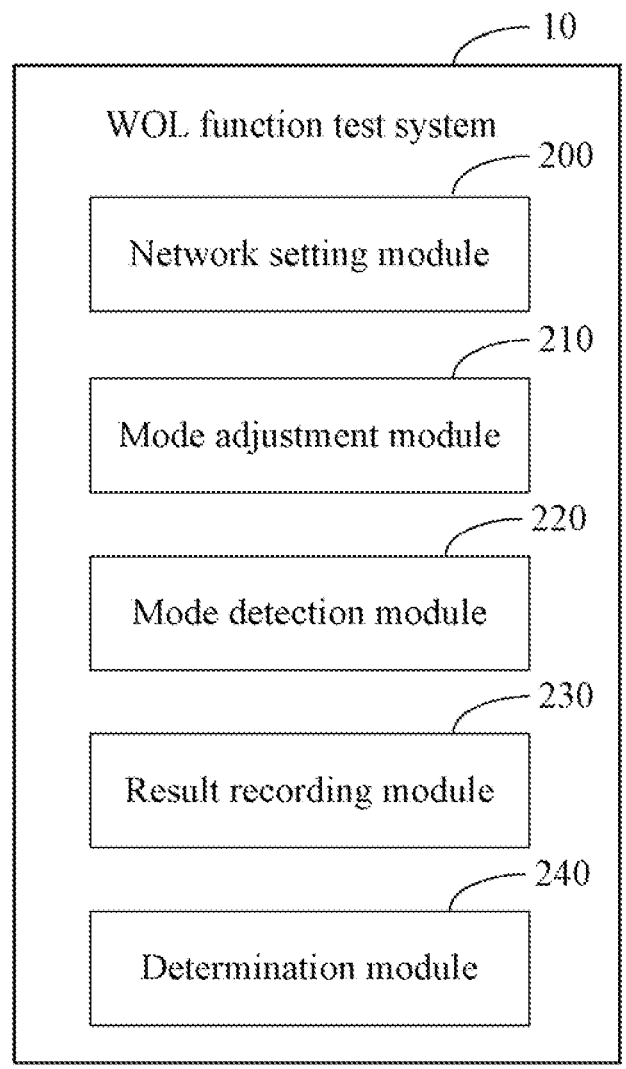
FIG. 2 is a block diagram illustrating functional modules of the system of FIG. 1.

FIG. 2 is a block diagram illustrating functional modules of the WOL function test system 10 of FIG. 1. In one embodiment, the system 10 includes a network setting module 200, a mode adjustment module 210, a mode detection module 220, a result recording module 230, and a determination module 240. The modules 200-240 may comprise computerized code in the form of one or more programs that are stored in the storage system 102. The computerized code includes instructions that are executed by the at least one processor 101 to provide functions for implementing the modules. In general, the word "module," as used herein, refers to logic embodied in hardware or firmware, or to a collection of software instructions, written in a program language. In one embodiment, the program language may be Java or C. One or more software instructions in the modules may be embedded in firmware, such as an EPROM. The modules described herein may be implemented as either software and/or hardware modules and may be stored in any type of computer-readable medium or other storage system.

The network setting module 200 is operable to obtain an Internet protocol (IP) address, a media access control (MAC) address, and a name of the computer 12, and set up a network connection between the server 11 and the computer 12 according to the IP address, the MAC address, and the name of the computer 12. In one embodiment, the IP address, the MAC address, and the name of the computer 12 can be detected from the LAN 14 automatically using the network setting module 200. In other embodiments, the IP address, the MAC address, and the name of the computer 12 can be input from an input device of the server 11.

The mode adjustment module 210 is operable to enable the computer 12 to a wake-up mode when the server 11 normally connects to the computer 12 through the LAN 14. As described above, the wake-up mode may one of the S1, S2, S3, S4, and S5 modes that comply to the ACPI specification for the computer 12.

The mode detection module 220 is operable to generate a wake-up command for waking up a WOL function of the computer 12, and send the wake-up command to the computer 12 to test the WOL function of the computer 12. After the computer 12 performs the WOL function test process, the computer 12 sends a data packet to the server 11 through the LAN 14. The mode detection module 220 is further operable to detect a current status of the computer 12 from the data packet when the data packet is received from the computer 12. In one embodiment, the current status may be a working status indicating that the computer 12 operates normally, or a wake-up status indicating that the computer 12 needs to be waken up by the server 11.

The result recording module 230 is operable to record the current status as a test result of the WOL function of the computer 12, and store the test result to the storage system 102. The result recording module 230 is further operable to count a test time when the test result is recorded in the storage system 102. In one embodiment, the test time may be initialized as zero before the WOL function test process for the computer 12.

The determination module 240 is operable to determine whether the test time is equal to a predefined total time. In one embodiment, the total time is predefined as a number value, such as 10 times, according to user requirements. If the test time is less then the total time, the WOL function test process of the computer 12 is repeated until the test time is equal to the total time. If the test time is equal to the total time, the determination module 240 terminates the WOL function test process of the computer 12 and displays the test result on a display of the server 11.

Figure 3:
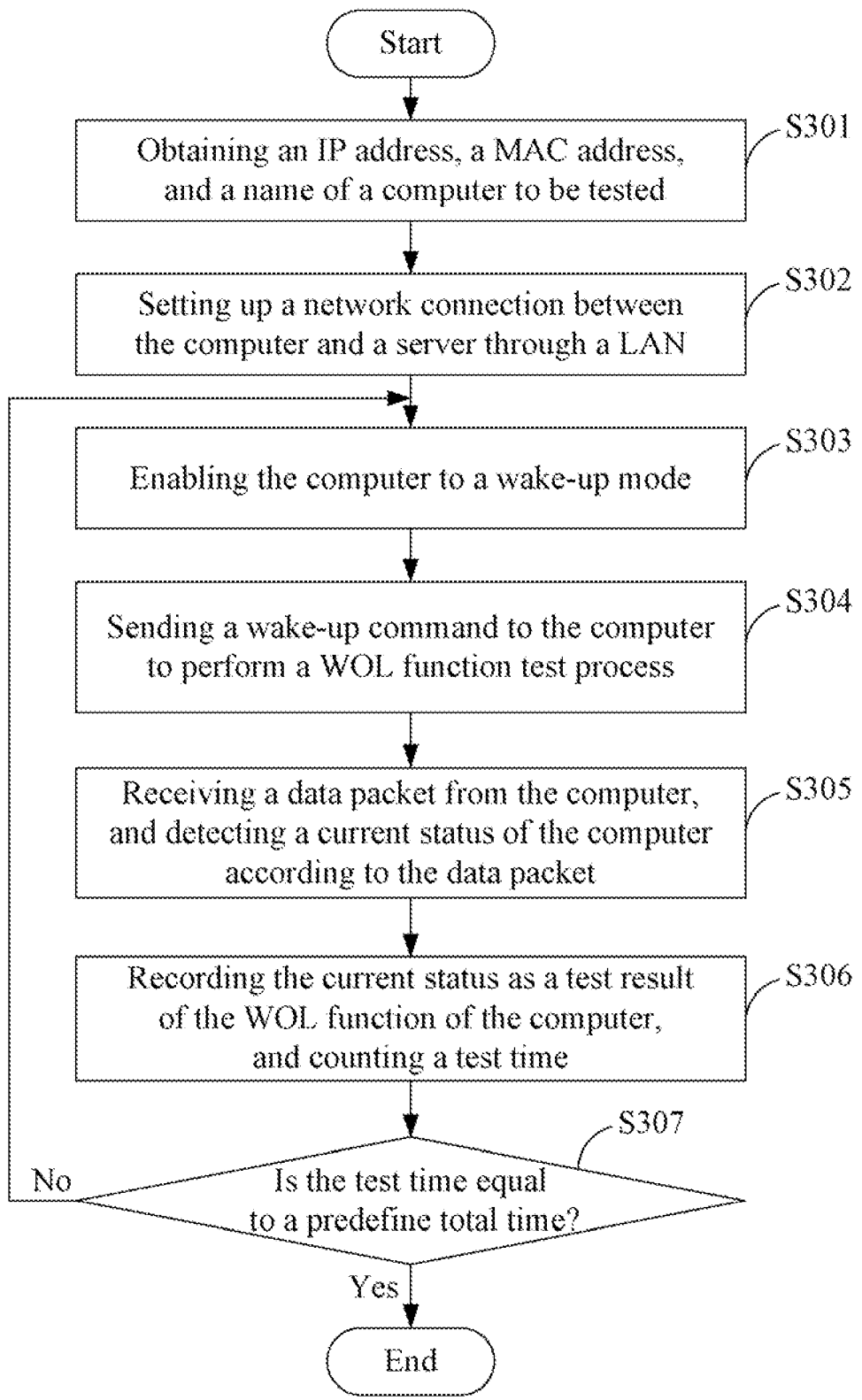
FIG. 3 is a flowchart of one embodiment of a method for testing WOL function of a computer using the system of FIG. 1.

FIG. 3 is a flowchart of one embodiment of a method for testing WOL function of a computer using the system 10 of FIG. 1. In the embodiment, the method can test the WOL function of the computer 12 through the NIC 13. Depending on the embodiment, additional blocks may be added, others removed, and the ordering of the blocks may be changed.

In block S301, the network setting module 200 obtains an IP address, a MAC address, and a name of the computer 12. In one embodiment, the IP address, the MAC address, and the name of the computer 12 can be detected from the LAN 14 automatically using the network setting module 200, and also can be input from an input device of the server 11.

In block S302, the network setting module 200 sets up a network connection between the server 11 and the computer 12 according to the IP address, the MAC address, and the name of the computer 12. In the embodiment, the computer 12 can communicate with the server 11 through the LAN 14 when the computer 12 connects to the LAN 14 via the NIC 13.

In block S303, the mode adjustment module 210 enables the computer 12 to a wake-up mode when the server 11 normally connects to the computer 12 through the LAN 14. As described above, the wake-up mode may one of the S1, S2, S3, S4, and S5 modes that comply to the ACPI specification for the computer 12.

In block S304, the mode detection module 220 generates a wake-up command for waking up the WOL function of the computer 12, and sends the wake-up command to the computer 12 to test the WOL function of the computer 12. After the computer 12 performs the WOL function test process, the computer 12 sends a data packet to the server 11 through the LAN 14.

In block S305, the mode detection module 220 receives the data packet from the computer 12, and detects a current status of the computer 12 from the data packet. In one embodiment, the current status may be a working status indicating that the computer 12 operates normally, or a wake-up status indicating that the computer 12 needs to be woke up by the server 11.

In block S306, the result recording module 230 records the current status as a test result of the WOL function of the computer 12, and stores the test result to the storage system 102 of the server 11. The result recording module 230 further counts a test time when the test result is recorded in the storage system 102. In one embodiment, the test time may be initialized as zero before the WOL function test process for the computer 12.

In block S307, the determination module 240 determines whether the test time is equal to a predefined total time. In one embodiment, the total time is a predefined number value, such as 10 times, according to user requirements. If the test time is less then the predefined total time, block S303 from block S306 is repeated until the test time is equal to the predefined total time. Otherwise, if the test time is equal to the predefined total time, the determination module 240 terminates the WOL function test process for the computer 12 and display the test result on a display of the server 11.

Although certain disclosed embodiments of the present disclosure have been specifically described, the present disclosure is not to be construed as being limited thereto. Various changes or modifications may be made to the present disclosure without departing from the scope and spirit of the present disclosure.

What is claimed is:

1. A server for testing a wake-up on LAN (WOL) function of a computer, the server connecting to the computer through a local area network (LAN), the server comprising:
    at least one processor; and
    a non-transitory machine-readable storage medium storing one or more programs, which when executed by the at least one processor, causes the at least one processor to:
    obtain an Internet protocol (IP) address, a media access control (MAC) address, and a name of the computer, and set up a network connection between the server and the computer according to the IP address, the MAC address, and the name of the computer;
    enable the computer to a wake-up mode when the server normally connects to the computer through the LAN;
    generate a wake-up command for waking up a WOL function of the computer, send the wake-up command to the computer to perform a WOL function test process, and detect a current status of the computer from a data packet when the data packet is received from the computer;
    record the current status as a test result of the WOL function of the computer, and store the test result to a storage system of the server;
    count a test time when the test result is stored in the storage system;
    determine whether the test time is equal to a predefined total time; and
    terminate the WOL function test process of the computer and display the test result on a display of the server when the test time is equal to the predefined total time.

2. The server according to claim 1, wherein the computer supports an advanced configuration and power interface (ACPI) specification that specifies one or more wake-up modes of the computer.

3. The server according to claim 1, wherein the current status is a working status indicating that the computer operates normally, or a wake-up status indicating that the computer needs to be woke up by the server.

4. A method for testing a wake-up on LAN (WOL) function of a computer, the computer connecting to a server through a local area network (LAN), the method being performed by execution of a computer-readable program stored in a non-transitory machine-readable storage medium and executed by at least one processor of the server, the method comprising:
    obtaining an Internet protocol (IP) address, a media access control (MAC) address, and a name of the computer detected from the LAN or input from an input device of the server;
    setting up a network connection between the server and the computer according to the IP address, the MAC address, and the name of the computer;
    enabling the computer to a wake-up mode when the computing device normally connects to the computer through the LAN;
    generating a wake-up command for waking up a WOL function of the computer, and sending the wake-up command to the computer to perform a WOL function test process;

detecting a current status of the computer from a data packet when the data packet is received from the computer;

recording the current status as a test result of the WOL function of the computer, and storing the test result to a storage system of the server;

counting a test time when the test result is stored in the storage system;

determining whether the test time is equal to a predefined total time; and terminating the WOL function test process of the computer and displaying the test result on a display of the server when the test time is equal to the predefined total time.

5. The method according to claim 4, wherein the computer supports an advanced configuration and power interface (ACPI) specification that specifies one or more wake-up modes of the computer.

6. The method according to claim 4, wherein the current status is a working status indicating that the computer operates normally, or a wake-up status indicating that the computer needs to be woke up by the server.

7. A non-transitory storage medium having stored thereon instructions that, when executed by at least one processor of a computing device that connects to a computer through a local area network (LAN), causes the at least one processor to perform a method for testing a wake-up on LAN (WOL) function of the computer, the method comprising:

obtaining an Internet protocol (IP) address, a media access control (MAC) address, and a name of the computer;

setting up a network connection between the computing device and the computer according to the IP address, the MAC address, and the name of the computer;

enabling the computer to a wake-up mode when the computing device normally connects to the computer through the LAN;

generating a wake-up command for waking up a WOL function of the computer, and sending the wake-up command to the computer to perform a WOL function test process;

detecting a current status of the computer from a data packet when the data packet is received from the computer;

recording the current status as a test result of the WOL function of the computer, and storing the test result to a storage system of the computing device;

counting a test time when the test result is stored in the storage system;

determining whether the test time is equal to a predefined total time; and terminating the WOL function test process of the computer and displaying the test result on a display of the server when the test time is equal to the predefined total time.

8. The storage medium according to claim 7, wherein the computer supports an advanced configuration and power interface (ACPI) specification that specifies one or more wake-up modes of the computer.

9. The storage medium according to claim 7, wherein the current status is a working status indicating that the computer operates normally, or a wake-up status indicating that the computer needs to be woke up by the computing device.

* * * * *